US012612231B2

(12) United States Patent
Ishii et al.

(10) Patent No.: US 12,612,231 B2
(45) Date of Patent: Apr. 28, 2026

(54) GAS BARRIER LAMINATE AND PACKAGING BODY USING THE SAME

(71) Applicant: TOPPAN INC., Tokyo (JP)

(72) Inventors: Rika Ishii, Tokyo (JP); Yumiko Kojima, Tokyo (JP); Shigemi Sugiyama, Tokyo (JP)

(73) Assignee: TOPPAN INC., Tokyo (JP)

( * ) Notice: Subject to any disclaimer, the term of this patent is extended or adjusted under 35 U.S.C. 154(b) by 338 days.

(21) Appl. No.: 18/206,384

(22) Filed: Jun. 6, 2023

(65) Prior Publication Data

US 2023/0312203 A1      Oct. 5, 2023

Related U.S. Application Data

(63) Continuation of application No. PCT/JP2021/044989, filed on Dec. 7, 2021.

(30) Foreign Application Priority Data

Dec. 7, 2020   (JP) ................................. 2020-202766

(51) Int. Cl.
B32B 27/30        (2006.01)
B65D 65/42        (2006.01)
(Continued)

(52) U.S. Cl.
CPC ............. B65D 65/42 (2013.01); B32B 27/306 (2013.01); C08K 5/5415 (2013.01); C08K 5/56 (2013.01);
(Continued)

(58) Field of Classification Search
CPC ....... C09D 129/04; C08L 29/04; B65D 65/42; B32B 27/20; B32B 27/306;
(Continued)

(56) References Cited

U.S. PATENT DOCUMENTS

2009/0181244 A1* 7/2009 Fukugami ............... B32B 27/34
                                                          428/476.3
2010/0189944 A1* 7/2010 Illsley ................... B32B 27/306
                                                          156/60
(Continued)

FOREIGN PATENT DOCUMENTS

JP         2004142238 A  *  5/2004  ........... B32B 38/164
JP         2007-261018 A      10/2007
(Continued)

OTHER PUBLICATIONS

International Searching Authority, "International Search Report," issued in connection with International Patent Application No. PCT/JP2021/044989, dated Feb. 1, 2022.
International Searching Authority, "Written Opinion," issued in connection with International Patent Application No. PCT/JP2021/044989, dated Feb. 1, 2022.

*Primary Examiner* — Michael C. Romanowski
(74) *Attorney, Agent, or Firm* — Foley & Lardner LLP

(57) ABSTRACT

A gas barrier laminate including a gas barrier layer and a sealing layer laminated on a substrate in this order, wherein the gas barrier layer is a layer formed by applying and heat-drying a coating solution containing a water-soluble polymer and at least one of a metal alkoxide represented by a general formula $M(OR_1)_n$ (where M is a metal element, $R_1$ is an alkyl group, and n is the oxidation number of the metal element) and a hydrolyzate of the metal alkoxide, a content of the water-soluble polymer is 50 wt % or more relative to a total mass of a solid content in the coating solution, a total content of the metal alkoxide and the hydrolyzate thereof is 5 to 50 wt % relative to the total mass of the solid content in the coating solution, and the sealing layer contains an aqueous heat seal varnish.

7 Claims, 1 Drawing Sheet

(51) Int. Cl.

| | |
|---|---|
| *C08K 5/5415* | (2006.01) |
| *C08K 5/56* | (2006.01) |
| *C09D 129/04* | (2006.01) |
| *D21H 19/56* | (2006.01) |
| *D21H 19/60* | (2006.01) |
| *D21H 19/80* | (2006.01) |

(52) U.S. Cl.
CPC ........... *C09D 129/04* (2013.01); *D21H 19/56* (2013.01); *D21H 19/60* (2013.01); *D21H 19/80* (2013.01); *B32B 2439/70* (2013.01); *B32B 2439/80* (2013.01)

(58) Field of Classification Search
CPC ............ B32B 2439/70; B32B 2439/80; C08K 5/5415; C08K 5/56; C08K 3/34; D21H 19/59; D21H 19/60; D21H 19/80; C08J 2329/04; C08J 2429/04
See application file for complete search history.

(56) References Cited

U.S. PATENT DOCUMENTS

| | | | | |
|---|---|---|---|---|
| 2018/0009206 A1* | 1/2018 | Murase | ..................... | B32B 9/00 |
| 2021/0310194 A1* | 10/2021 | Tsuruhara | ............. | D21H 21/52 |
| 2022/0154031 A1* | 5/2022 | Shibata | ................. | B65D 65/42 |

FOREIGN PATENT DOCUMENTS

| | | | | |
|---|---|---|---|---|
| JP | 2008073986 | A | * | 4/2008 |
| JP | 2008105283 | A | * | 5/2008 |
| JP | 2010000677 | A | * | 1/2010 |
| JP | 2016-156119 | A | | 9/2016 |
| JP | 2018-126880 | A | | 8/2018 |
| JP | 6668576 | B1 | | 3/2020 |
| JP | 2020069783 | A | * | 5/2020 |
| JP | 2021-094750 | A | | 6/2021 |
| JP | 2021-094751 | A | | 6/2021 |

* cited by examiner

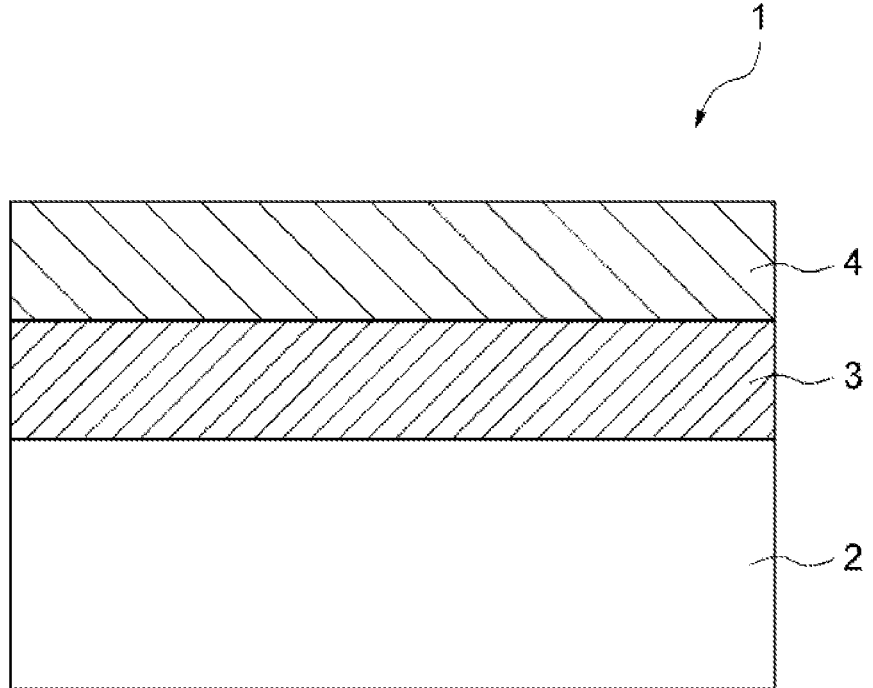

GAS BARRIER LAMINATE AND PACKAGING BODY USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/044989, filed on Dec. 7, 2021, which in turn claims the benefit of JP 2020-202766, filed Dec. 7, 2020, the disclosures of all which are incorporated herein by reference in its entirety.

TECHNICAL FIELD

The present disclosure relates to gas barrier laminates used in the field of packaging of food, non-food products, pharmaceuticals, and the like, and to gas barrier laminates with high gas barrier properties, and which are intended to reduce environmental load, as well as packaging bodies using the same.

BACKGROUND

To prevent the contents from being degraded and their functions and nature changing, packaging materials for packaging food, non-food products, pharmaceuticals, and the like are used that, among other functions, serve to prevent them from being affected by oxygen, moisture, and other gases passing through the packaging material and degrading the contents. Aluminum foil is sometimes used as the material to achieve this. Although aluminum foil is lighter than glass bottles and plastic bottles, its high specific gravity requires more energy to transport products filled with contents, and when discarded packaging materials are incinerated, a large amount of ash is generated, making environmental suitability an issue.

In a known method for making the material more eco-friendly, a thin film of metal, aluminum for example, or metal oxide, is formed on a substrate to impart gas barrier properties. Another example is to wet-coat the substrate with a material that is highly gas-impermeable. According to these methods, laminates with high gas barrier performance can be obtained, which can also be said to be more eco-friendly since similar performance can be obtained with less materials.

In particular, the environmental load can be reduced when aqueous wet coating is used because there is no emission of organic solvent to the atmosphere during production, and equipment for collecting the organic solvent is not required. Therefore, a material and a wet coating process that improve the ease of manufacturing and produce high gas barrier performance have been desired. PTL 1 proposes using a coating layer obtained by applying a coating solution containing a hydroxyl group-containing polymer compound, metal alkoxide, and a hydrolyzate thereof to a plastic substrate, as a gas barrier layer, and then heat-drying it.

To produce the contents in a hermetically sealed packaging bag, the laminate is processed, for example, folded, and inner faces are sealed so that a bag is formed. The sealing is typically carried out by providing a thermoplastic resin on the innermost surface of the laminate and heat-sealing the laminate. For example, olefin resins such as polyethylene resin, polypropylene resin, and ethylene-vinyl acetate copolymers that have a low melting point and good workability may be used as the thermoplastic resin used to form the heat seal layer. The thickness of the heat seal layer is set according to factors such as the type and weight of the contents, but it is generally 30 μm or more due to limitations on the processing of the heat seal layer. Dry lamination and extrusion lamination are methods often used to laminate this heat seal layer with the substrate of the laminate, and both use solvent-based adhesives. The heat seal layer is essential for producing an airtight packaging bag, but it imposes a large environmental load due to the amount of thermoplastic resin used, the use of an organic solvent, and the like.

To address the above-described problems of the heat seal layer, it has been proposed to produce an aqueous heat-sealing varnish by wet coating. That is, as a gas barrier laminate with a small environmental load, there is a demand for a laminate in which a gas barrier layer formed by aqueous wet coating and a heat seal layer formed by aqueous wet coating are laminated on the substrate. In the case of a heat seal varnish, it may usually have a thickness of 10 μm or less. PTLs 2 and 3 disclose examples of gas barrier layers formed by aqueous wet coating.

[Citation List] [Patent Literature] [PTL 1] JP 2007-261018 A; [PTL 2] JP 2018-126880 A; [PTL 3] JP 6668576 B.

SUMMARY OF THE INVENTION

Technical Problem

However, after forming the coating layer of PTL 1, it is necessary to apply water by spraying or gravure coating in order to increase the density of the coating layer. In addition, since a thin film layer made of aluminum oxide is provided as a base for the coating layer, the configuration and process become complicated, and a large amount of manufacturing energy is required.

The gas barrier layers disclosed in PTLs 2 and 3 are designed to be used with a heat seal layer that is a film of polyethylene or another material. When aqueous heat seal varnish is used as the sealing layer, the following problems arise. That is, when aqueous heat seal varnish is wet-coated on a gas barrier layer formed by aqueous wet coating, processing conditions are limited in order to prevent cissing of the coating solution. As a result, the underlying gas barrier layer may re-dissolve or swell, making the gas barrier performance unstable. If the crosslink density of the gas barrier layer is increased in order to prevent it from re-dissolving and swelling, the film becomes rigid and brittle, which makes the gas barrier properties more prone to deterioration. In addition, since this causes the layer thickness of the heat seal varnish to decrease, the effect of the sealing layer to protect the gas barrier layer from mechanical deterioration decreases. This also makes the gas barrier layer vulnerable to deterioration.

In view of the above issues, the present disclosure provides a gas barrier laminate whose manufacturing method and constituent materials are highly eco-friendly, having a high mechanical strength, and a packaging body using the same. In particular, the present disclosure relates to a gas barrier laminate having an aqueous gas barrier layer that is compatible with aqueous heat seal varnish as a heat seal layer.

Solution to Problem

To solve the above problems, an aspect of the present disclosure is a gas barrier laminate including a gas barrier layer and a sealing layer laminated on a substrate in this order, wherein the gas barrier layer is a layer formed by applying and heat-drying a coating solution containing a water-soluble polymer and at least one of a metal alkoxide represented by a general formula $M(OR_1)_n$ (where M is a metal element, $R_1$ is an alkyl group, and n is the oxidation number of the metal element) and a hydrolyzate of the metal alkoxide, a content of the water-soluble polymer is 50 wt % or more relative to a total mass of a solid content in the coating solution, a total content of the metal alkoxide and the hydrolyzate thereof is 5 to 50 wt % relative to the total mass of the solid content in the coating solution, and the sealing layer contains an aqueous heat seal varnish.

The content of the water-soluble polymer may be 70 wt % or more relative to the total mass of the solid content in the coating solution, and the total content of the metal alkoxide and the hydrolyzate thereof may be 5 to 30 wt % relative to the total mass of the solid content in the coating solution.

The gas barrier layer may contain a scale-like filler, the scale-like filler may have a particle size of 0.2 to 10 μm and an aspect ratio of 50 or higher, and a total content of the metal alkoxide, the hydrolyzate thereof, and the scale-like filler may be 5 to 30 wt % relative to the total mass of the solid content in the coating solution.

The metal alkoxide may be tetraethoxysilane. The scale-like filler may be a silica filler having silanol groups on its surface, and the amount of silanol groups may be 10 to 70 μmol/m². The water-soluble polymer may contain polyvinyl alcohol, and the polyvinyl alcohol may have a degree of saponification of 90% or higher and a degree of polymerization of 500 or higher. The gas barrier laminate may include a deposition layer containing a metal or a metal oxide, the deposition layer being disposed between the substrate and the gas barrier layer. The substrate may be a paper.

Another aspect of the present disclosure is a packaging body in which the above-described gas barrier laminate is used.

Advantageous Effects of the Invention

According to the present disclosure, it is possible to provide a gas barrier laminate whose manufacturing method and constituent materials are highly eco-friendly and have a high mechanical strength, and a packaging body using the same.

BRIEF DESCRIPTION OF THE DRAWINGS

The FIGURE is a schematic cross-sectional view of a laminate structure of a gas barrier laminate according to an embodiment of the present disclosure.

DETAILED DESCRIPTION

Embodiments of the present disclosure will be described in detail. The present invention is not limited to the following embodiments.

The FIGURE is a schematic cross-sectional view of a laminate structure of a gas barrier laminate 1 according to an embodiment of the present disclosure. The gas barrier laminate 1 includes a gas barrier layer and a sealing layer 4 laminated in this order on a substrate 2.

The gas barrier layer 3 of the present disclosure is a layer formed by heat-drying a coating solution containing a water-soluble polymer and either a metal alkoxide represented by the general formula $M(OR_1)_n$ (where M is a metal element, $R_1$ is an alkyl group such as $CH_3$ or $C_2H_5$, and n is the oxidation number of the metal element) or a hydrolyzate of the metal alkoxide. The gas barrier layer 3 may be a cured product of the composition containing a water-soluble polymer and either a metal alkoxide represented by the general formula $M(OR_1)_n$ or a hydrolyzate of the metal alkoxide. The gas barrier layer 3 may be a composite layer obtained by heat-drying a coating solution containing a water-soluble polymer and either a metal alkoxide represented by the general formula $M(OR_1)_n$ or a hydrolyzate of the metal alkoxide.

Examples of the water-soluble polymer include polyvinyl alcohol, poly(vinyl alcohol-co-ethylene), polyvinyl pyrrolidone, starch, cellulose, methyl cellulose, carboxymethyl cellulose, sodium alginate, and polyacrylic acid. In particular, the water-soluble polymer may contain polyvinyl alcohol (PVA). The PVA referred to here is generally obtained by saponification of polyvinyl acetate, and may either be partially hydrolyzed PVA in which several tens of percent of the acetic acid groups remain, or a completely hydrolyzed PVA in which only a small percent of the acetic acid groups remains. The PVA may have a degree of saponification of 90% or higher in order to have many hydroxyl groups to exhibit good gas barrier performance. In addition, the PVA may have a degree of polymerization of 500 or higher in order for the coating of the gas barrier layer formed using it to have good toughness and gas barrier performance.

The content of the water-soluble polymer may be 60 wt % or more, 70 wt % or more, 75 wt % or more, 80 wt % or more, 85 wt % or more, 90 wt % or more, or 95 wt % or more relative to the total mass of the solid content in the coating solution forming the gas barrier layer, to allow it to have a good water vapor transmission rate even after bending. The content of the water-soluble polymer may be 95 wt % or less, 90 wt % or less, 85 wt % or less, 80 wt % or less, 75 wt % or less, or 70 wt % or less relative to the total mass of the solid content in the coating solution forming the gas barrier layer. The content of the water-soluble polymer may be 50 to 95 wt %, 70 to 95 wt %, or 80 to 95 wt % relative to the total mass of the solid content in the coating solution forming the gas barrier layer.

The metal alkoxide of the present disclosure represented by the general formula $M(OR_1)_n$ (where M is a metal element, $R_1$ is an alkyl group such as $CH_3$ or $C_2H_5$, and n is the oxidation number of the metal element) may be condensed after hydrolysis to form a glass-like film. Since the metal alkoxide and hydrolyzate thereof also crosslink with a water-soluble polymer having hydroxyl groups, they can improve the water resistance of the water-soluble gas barrier coating. The metal alkoxide may be tetraethoxysilane [Si$(OC_2H_5)_4$], triisopropoxyaluminum [Al(O-2'-$C_3H_7$)$_3$], or the like, and it may be tetraethoxysilane considering the gas barrier performance, suitability to coating, and the like.

Examples of the metal element M of the metal alkoxide include Si, Al, Ti, Zr, and the like. The metal element M of the metal alkoxide may be Si or Al. The alkyl group $R_1$ may have 1 to 8, 2 to 6, 2 to 4, or 2 to 3 carbon atoms.

The total content of the metal alkoxide and hydrolyzate thereof is 5 to 50 wt % relative to the total mass of the solid content in the coating solution forming the gas barrier layer. The total content of the metal alkoxide and hydrolyzate thereof may be 40 wt % or less, 30 wt % or less, 25 wt % or less, 20 wt % or less, 15 wt % or less, or 10 wt % or less relative to the total mass of the coating solution forming the gas barrier layer. The total content of the metal alkoxide and hydrolyzate thereof may be 10 wt % or more, 15 wt % or more, 20 wt % or more, or 25 wt % or more relative to the total mass of the solid content of the coating solution forming the gas barrier layer. The total content of the metal alkoxide and hydrolyzate thereof may be 5 to 40 wt %, 5 to 30 wt %, or 5 to 20 wt % relative to the total mass of the solid content in the coating solution forming the gas barrier layer.

The gas barrier layer 3 of the present disclosure may be a composite layer formed by heat-drying a coating solution containing a water-soluble polymer, a metal alkoxide represented by the general formula $M(OR_1)_n$ (where M is a metal element, $R_1$ is an alkyl group such as $CH_3$ or $C_2H_5$, and n is the oxidation number of the metal element), and a hydrolyzate of the metal alkoxide. A non-volatile component is contained so that the mass ratio of the water-soluble polymer and the metal alkoxide and hydrolyzate thereof in the coating solution is, for example, 5:5 to 9.5:0.5 (preferably 7:3 to 9.5:0.5). That is, the mass ratio of the water-soluble polymer to the metal alkoxide and hydrolyzate thereof (the mass content of the water-soluble polymer/the mass content of the metal alkoxide and hydrolyzate thereof) is, for example, 1 to 19 (preferably 2.3 to 19). When the mass ratio of the water-soluble polymer is the above mass ratio or higher, that is, when it has a mass ratio of 1 or higher (preferably 2.3 or higher), the gas barrier layer, whose main component is the water-soluble polymer, can have a large enough amount of flexible component to prevent excessive crosslinking bonds being produced by the metal alkoxide. This prevents the gas barrier layer from becoming too rigid, and facilitates preventing the gas barrier performance from deteriorating due to the laminate being bent or stretched. In addition, when the mass ratio of the water-soluble polymer is the above mass ratio or lower, that is, when the mass ratio is 19 or lower, the number of crosslinking bonds produced by the metal alkoxide does not become too small. This prevents the gas barrier performance from deteriorating due to the water content causing the film to swell. In addition, even if the gas barrier layer absorbs water and swells during coating by the aqueous heat seal varnish in subsequent steps, it is possible to prevent it from cracking during re-drying due to the difference in shrinkage. The mass ratio of the water-soluble polymer to the metal alkoxide and hydrolyzate thereof is, for example, 8:2 or more and 9.5:0.5 or less. More specifically, the mass ratio of the water-soluble polymer to the metal alkoxide and hydrolyzate thereof is 1.5 to 19, 2.3 to 19, 3 to 19, 4 to 19, 5.7 to 19, or 9 to 19.

As described above, by finely adjusting the composition of the coating solution containing a water-soluble polymer, a metal alkoxide, and a hydrolyzate thereof, it is possible to finely adjust the physical properties of the film formed by heat-drying the coating solution.

A filler may be added to the gas barrier layer according to an embodiment of the present disclosure while maintaining the composition ratio of the water-soluble polymer to the metal alkoxide and hydrolyzate thereof. A particulate filler increases the strength of the gas barrier layer. A scale-like filler improves the gas barrier performance.

The gas barrier layer may contain a scale-like filler. Although the material of the scale-like filler that can be used for the present disclosure is not particularly limited, examples thereof include kaolin, clay, engineered kaolin, delaminated clay, ground calcium carbonate, light calcium carbonate, mica, talc, titanium dioxide, barium sulfate, calcium sulfate, zinc oxide, silicic acid, silicate, silica (for example, colloidal silica), and satin white.

The particle size of the scale-like filler may be 0.2 to 10 μm, 0.2 to 5 μm, or 0.2 to 1 μm. The particle size of a filler means the number average particle size, and can be measured with an electron microscope.

The aspect ratio of a scale-like filler may be 50 or higher, 80 or higher, or 100 or higher, and may be 500 or lower, 400 or lower, or 300 or lower. The aspect ratio of a scale-like filler may be 50 to 500, 80 to 400, or 100 to 300. The aspect ratio of a filler is defined as the ratio of the maximum length of the filler to the minimum length thereof in a direction perpendicular to the direction of the maximum length as observed under a microscope.

When the scale-like filler has high water resistance, the scale-like filler contained in the water-soluble polymer such as a PVA enhances the water resistance of the coating, as with a metal alkoxide such as tetraethoxysilane. By using a filler with a high aspect ratio, the gas barrier performance can be improved due to the labyrinth effect. When the particle size of the scale-like filler is 0.2 μm or more, the effect of improving the gas barrier performance owing to the labyrinth effect can be sufficiently obtained. This facilitates improving the gas barrier performance of the coating entirely. A scale-like filler with a particle size of 10 μm or less provides good workability. The coating will be less prone to defects, and the gas barrier performance is less likely to deteriorate. When the aspect ratio of the filler is 50 or higher, the labyrinth effect can be sufficiently obtained, which facilitates improving the gas barrier performance.

The content of the scale-like filler in the gas barrier layer may be 1 to 20 wt %, 2 to 15 wt %, or 3 to 10 wt % relative to the total mass of the solid content in the coating solution forming the gas barrier layer.

The total content of the scale-like filler, the metal alkoxide, and hydrolyzate thereof in the gas barrier layer may be 5 to 30 wt %, 5 to 20 wt %, or 5 to 15 wt % relative to the total mass of the solid content in the coating solution forming the gas barrier layer. When the total content of the scale-like filler, metal alkoxide and hydrolyzate thereof is within these ranges, among other effects, the gas barrier layer does not become too rigid and cracks are less likely to occur in the gas barrier layer. Therefore, the gas barrier performance is less likely to decrease.

For better gas barrier performance and water resistance, the scale-like filler may be a silica filler (silica particles) having silanol groups on its surface. The amount of silanol groups on the surface of the silica filler may be 10 to 70 $\mu mol/m^2$, 15 to 60 $\mu mol/m^2$ or 20 to 45 $\mu mol/m^2$. When the amount of silanol groups on the surface of the silica filler is 10 $\mu mol/m^2$ or more, the silica filler can tightly adhere to the water-soluble polymer. The $SiO_2$ purity of the silica particles may be, for example, 95 wt % or higher, or 98 wt % or higher. When the water-soluble polymer has silanol groups, the water resistance and gas barrier performance can be further improved because the silanol groups on the surface of the flaked silica filler and the silanol groups in the water-soluble polymer tightly adhere to each other through hydrogen bonds.

The gas barrier layer may have a thickness of 0.1 to 50 μm, 0.2 to 20 μm, or 0.5 to 10 μm.

Various kinds of plastic films and paper can be used as the substrate of the present disclosure. Biodegradable plastic film, biomass plastic film, and paper are suitable as the substrate in terms of environmental load because they are made of natural materials and will undergo decomposition by microorganisms when disposed of in the environment.

The thickness of the substrate may be 3 μm or more, 6 μm or more, or 10 μm or more, and may be 200 μm or less, 100 μm or less, or 50 μm or less. The thickness of the substrate may be 3 to 200 μm or 10 to 50 μm.

The sealing layer according to the present disclosure contains heat seal varnish. The heat seal varnish is not particularly limited as long as it is aqueous. The aqueous heat seal varnish suffices if the heat seal varnish component is dispersed in an aqueous solvent (for example, water). For example, acrylic resin emulsion, styrene-acrylic emulsion, ionomer emulsion, polyolefin emulsion, or the like dispersed in an aqueous solvent can be used. In particular, an aqueous polyolefin resin having at least one selected from a carboxyl group, a salt of a carboxyl group, a carboxylic anhydride group, and carboxylic ester may be used. By using aqueous polyolefin resin, not only the heat-sealability but also a dense heat seal layer can be obtained, and moisture barrier properties can also be expected. For its eco-friendliness, a biodegradable heat-sealing agent such as polylactic acid or polybutylene succinate may be used.

The heat seal layer may contain components other than the aforementioned components. Examples of other components include a silane coupling agent, organic titanate, acrylic resin, polyester, polyurethane, polycarbonate, polyurea, polyamide, polyolefin emulsions, polyimide, melamine resin, and phenol resin. The amount of these other components added may be 50 wt % or more, 70 wt % or more, 90 wt % or more, or even 100 wt % relative to the above-described heat seal varnish components.

The thickness of the heat seal layer may be, for example, 0.05 μm or more, 0.5 μm or more, or 1 μm or more, and 20 μm or less, 10 μm or less, or 5 μm or less. When the thickness of the heat seal layer is 1 to 5 μm, it is possible to obtain a sufficient heat-sealing strength, and at the same time, provide a laminate that is resistant to bending and has a reduced amount of plastic.

A gas barrier laminate according to an embodiment of the present disclosure may include a deposition layer containing metal or metal oxide between the substrate and the gas barrier layer. In particular, when a plastic film is used as the substrate, the transparency can be maintained by using a deposition layer of a metal oxide such as aluminum oxide. On the other hand, when an opaque substrate such as a paper substrate is used, using a deposition layer of aluminum facilitates manufacturing. By providing the gas barrier laminate with a deposition layer, the gas barrier performance of the gas barrier laminate can be improved without greatly increasing the burden on the environment. This allows packaging bodies produced using the gas barrier laminate to have a wider range of uses. The deposition layer may have a thickness of 0.01 to 1 μm, 0.02 to 0.5 μm, or 0.04 to 0.1 μm.

The deposition layer can be formed by, for example, vacuum deposition, plasma-enhanced deposition, ion beam-enhanced deposition, sputtering, reactive deposition, or the like. For better productivity, the deposition layer may be formed by vacuum vapor deposition. For better adhesion between the deposition layer and the substrate layer, and a denser deposition layer, plasma-enhanced deposition or ion beam-enhanced deposition may be used. For a more transparent deposited film, reactive deposition may be used in which gases such as oxygen are supplied.

In the gas barrier laminate, an anchor coat layer may be provided on the substrate to improve smoothness and adhesion prior to vapor deposition. The anchor coat layer is formed by, for example, applying a (meth)acrylic primer solution containing (meth)acrylic resin or the like to a substrate using gravure coating, roll coating, bar coating, or the like, and then drying it.

The gas barrier layer and the sealing layer of the present disclosure may be formed by using a common method known in the art such as dipping, roll coating, screen printing, spray coating, gravure printing or the like for their respective coating solutions. Before the coating, the substrate surface may be subjected to surface treatment such as corona treatment or atmospheric pressure plasma treatment.

A packaging bag using a gas barrier laminate according to an embodiment of the present disclosure can contain items such as food and pharmaceuticals. In particular, among foods, it is suitable for packaging sweets and the like. The packaging bag according to the present embodiment can maintain good gas barrier performance even when it has a shape with a folded part. The gas barrier laminate according to the present disclosure can be used as various kinds of packaging bodies such as three-side seal pouches, four-side seal pouches, pillow packages, gusset packages, and standing pouches.

EXAMPLES

The gas barrier laminate according to the present disclosure will be described in more detail with reference to Examples.

<Substrate>

The following three substrates were prepared.

PET: Biaxially oriented PET film (with a thickness of 12 μm). The corona-treated surface was subjected to processing in subsequent steps.

PET/AlO: An aluminum oxide thin-film layer having a thickness of 40 nm was formed on a biaxially oriented PET film (with a thickness of 12 μm) by vacuum deposition using electron beam heating with Al as the deposition source. The aluminum oxide thin-film layer was subjected to processing in subsequent steps.

Paper/AlO: After performing primer treatment on a 50 g/m² paper substrate, an aluminum oxide thin-film layer was formed on the treated surface in the same manner as in the PET/AlO described above. Then, the aluminum oxide thin-film layer was subjected to processing in subsequent steps.

<Gas Barrier Layer>

The following two water-soluble polymers (A) were prepared.

PVA: A water/IPA (90/10) solution containing 5 wt % of polyvinyl alcohol (with a degree of saponification of 98.5% and a degree of polymerization of 500) was prepared.

PAA: An aqueous solution containing 5 wt % of polyacrylic acid (with a molecular weight of 5000) was prepared.

The following three metal alkoxides (B) were prepared.

TEOS: A hydrolyzed solution with a solid content of 3 wt % ($SiO_2$ equivalent) obtained by adding 89.6 g (0.05N) of hydrochloric acid to 10.4 g of tetraethoxysilane and stirring for 30 minutes to cause hydrolysis.

MTMOS: A hydrolyzed solution with a solid content of 3 wt % ($SiO_2$ equivalent) obtained by adding 80 g (0.05N) of hydrochloric acid to 10 g of methyltrimethoxysilane and stirring for 30 minutes to cause hydrolysis.

NCO: An aqueous solution containing 3 wt % of 1,3,5-tris(3-trialkoxysilylalkyl) isocyanurate.

The following two fillers (C) were prepared.

Montmorillonite: KUNIPIA-F, a silicate filler (with a particle size of 300 nm and an aspect ratio of 300) manufactured by KUNIMINE INDUSTRIES CO., LTD.

Silanol group-containing silica filler: SUNLOVELY LFS (with a particle size of 0.5 μm and an aspect ratio of 120) manufactured by AGC Si-Tech Co., Ltd.

<Sealing Layer>

The following three types of heat-sealing varnish were prepared.

CHEMIPEARL S500: An aqueous varnish manufactured by Mitsui Chemicals, Inc.

ZAIKTHENE AC: An aqueous varnish manufactured by Sumitomo Seika Chemicals Co., Ltd.

UNISTOLE R200: A solvent (toluene)-based varnish manufactured by Mitsui Chemicals, Inc.

The substrate, gas barrier layer, and sealing layer of each gas barrier laminate were prepared according to the combinations shown in Table 1.

<Method of Solution Preparation>

The metal alkoxide (B) was added to the water-soluble polymer solution (A) according to combinations shown in Table 1 and stirred for 30 minutes to obtain coating solutions having a solid content of 3 wt %. When adding the filler (C), it was added to the water-soluble polymer solution and stirred for 30 minutes, and then the metal alkoxide (B) was added in the same manner as described above, and the solution was stirred for 30 minutes to obtain coating solutions having a solid content of 3 wt %. The formulation ratios in Table 1 each show the mass ratio of the solid content of the corresponding component.

<Coating of Gas Barrier Layer>

The prepared coating solution was applied to the substrate using a bar coater and dried in an oven at 120° C. for 30 seconds to form a gas barrier layer having a thickness of 1 μm.

<Coating of Sealing Layer>

A heat-sealing varnish was applied to the gas barrier layer on the substrate with a bar coater and dried in an oven at 120° C. for 30 seconds. The thickness of the sealing layer formed of aqueous varnish or solvent-based varnish was 3 μm.

The laminates prepared according to Table 1 were evaluated as follows.

<Odor>

A 15 cm square three-side seal bag made of the laminate was filled with 30 ml of air and allowed to stand at room temperature for 24 hours. Then, the three-side seal bag was opened, and sensory evaluation was performed by checking whether there was an odor or not. When one or more of three evaluators judged that there was an odor, the sample was rated "Poor". When none of them judged that there is an odor, the sample was rated "Good".

<Appearance>

A 100 mm² area of the laminate was observed from the sealing layer surface side thereof with a 10× magnifying glass to count the number of cracks.

<Sealing Strength>

The sealing layers of the laminate were heat-sealed with a heat sealer under the conditions of 120° C., 1 second, and 0.2 MPa. The heat-sealed sample was cut into a strip having a width of 15 mm, and the sealing strength was measured by peeling apart the sealed parts by 90° at a peeling rate of 300 mm/min.

<Water Vapor Transmission Rate (WVTR (g/m²/day))>

The water vapor transmission rate was measured under the conditions of 40° C. and 90% RH using the MOCON method.

In addition, to evaluate the gas barrier performance (water vapor transmission rate) of the laminate when deformed, a 600 g roll was run at a speed of 300 mm/min over the laminate folded with the sealing layer side facing outward. After unfolding the sample, the water vapor transmission rate was measured in the same manner as above.

Table 2 shows the evaluation results for each laminate. It can be seen from the Examples that gas barrier laminates suitable for use as packaging bodies are obtained.

TABLE 1

| | Substrate | Water soluble polymer (A) | Metal alkoxide (B) | Filler (C) | Mixture ratio (A) | (B) | (C) | Seal agent |
|---|---|---|---|---|---|---|---|---|
| Ex. 1 | PET/AlO | PVA | TEOS | — | 95 | 5 | — | CHEMIPEARL S500 |
| Ex. 2 | PET/AlO | PVA | TEOS | — | 95 | 5 | — | ZAIKTHENE AC |
| Ex. 3 | Paper/AlO | PVA | TEOS | — | 95 | 5 | — | CHEMIPEARL S500 |
| Ex. 4 | PET | PVA | TEOS | — | 95 | 5 | — | CHEMIPEARL S500 |
| Ex. 5 | PET/AlO | PVA | TEOS | Montmorillonite | 90 | 5 | 5 | CHEMIPEARL S500 |
| Ex. 6 | PET/AlO | PVA | TEOS | Silica filler | 90 | 5 | 5 | CHEMIPEARL S500 |
| Ex. 7 | PET/AlO | PVA | TEOS | — | 80 | 20 | — | CHEMIPEARL S500 |
| Ex. 8 | PET/AlO | PVA | TEOS | — | 70 | 30 | — | CHEMIPEARL S500 |
| Ex. 9 | PET/AlO | PVA | TEOS | — | 95 | 5 | — | CHEMIPEARL S500 |
| Ex. 10 | PET/AlO | PVA | MTMOS | — | 95 | 5 | — | CHEMIPEARL S500 |
| Ex. 11 | PET/AlO | PVA | TEOS | — | 50 | 50 | — | CHEMIPEARL S500 |
| Ex. 12 | Paper/AlO | PVA | TEOS | — | 50 | 50 | — | CHEMIPEARL S500 |
| Comp. Ex. 1 | PET/AlO | PVA | NCO | — | 95 | 5 | — | CHEMIPEARL S500 |
| Comp. Ex. 2 | PET/AlO | PVA | — | — | 100 | — | — | CHEMIPEARL S500 |
| Comp. Ex. 3 | PET/AlO | PVA | TEOS | — | 95 | 5 | — | UNISTOLE R200 |
| Comp. Ex. 4 | PET/AlO | PVA | TEOS | — | 99.9 | 0.1 | — | CHEMIPEARL S500 |

TABLE 2

| | | | | WVTR (g/m²/day) | |
|---|---|---|---|---|---|
| | | Appearance | Sealing strength | | |
| | | | | Evaluation results | |
| | Odor | Number of cracks | (N/15 mm) | Initial | After bending |
| Ex. 1 | Good | 0 | 6.3 | 0.5 | 0.8 |
| Ex. 2 | Good | 0 | 6.1 | 0.6 | 0.9 |
| Ex. 3 | Good | 0 | 6.5 | 2.1 | 5.6 |
| Ex. 4 | Good | 0 | 6.3 | 20.0 | 22.0 |
| Ex. 5 | Good | 0 | 5.9 | 0.2 | 0.4 |
| Ex. 6 | Good | 0 | 4.2 | 0.5 | 0.7 |
| Ex. 7 | Good | 0 | 6.4 | 0.4 | 1.2 |
| Ex. 8 | Good | 0 | 6.8 | 0.3 | 2.4 |
| Ex. 9 | Good | 0 | 6.2 | 1.6 | 2.3 |
| Ex. 10 | Good | 0 | 4.2 | 1.2 | 1.9 |
| Ex. 11 | Good | 0 | 5.6 | 0.2 | 7.0 |
| Ex. 12 | Good | 0 | 5.6 | 2.2 | 80.0 |
| Comp. Ex. 1 | Good | 40 | 1.5 | 1.1 | 2.0 |
| Comp. Ex. 2 | Good | 50 | 1.2 | 8.2 | 9.6 |
| Comp. Ex. 3 | Poor | 0 | 6.8 | 0.4 | 0.8 |
| Comp. Ex. 4 | Good | 5 | 3.5 | 1.3 | 1.5 |

[Reference Signs List] 1 . . . Gas barrier laminate; 2 . . . Substrate; 3 . . . Gas barrier layer; 4 . . . Sealing layer.

What is claimed is:

1. A gas barrier laminate, comprising:

a substrate consisting of PET/AlO, PET, paper, or paper/AlO;

a gas barrier layer on the substrate; and a sealing layer on the gas barrier layer, wherein the gas barrier layer is a layer formed by applying and heat-drying a coating solution containing 70 to 95 wt % of polyvinyl alcohol relative to a total mass of a solid content in the coating solution and 5 to 30 wt % relative to the total mass of the solid content in the coating solution of at least one metal alkoxide selected from the group consisting of tetraethoxysilane, methyltrimethoxysilane, 1,3,5-tris(3-trialkoxysilylalkyl) isocyanurate, and hydrolyzates thereof, the sealing layer is formed from an aqueous heat seal varnish comprising an aqueous polyolefin resin, a heat sealing strength of the sealing layer is 4.2-6.8 N/15 mm, determined at a 90° peel angle and a peeling rate of 300 mm/min, and a ratio of a water vapor transmission rate of the laminate at 40° C. and 90% relative humidity after deformation with a 600 g roll at a speed of 300 mm/min in a folded configuration with the sealing layer facing outward to a water vapor transmission rate of the laminate at 40° C. and 90% relative humidity before the deformation is 1.1 to 8.0.

2. The gas barrier laminate of claim 1, wherein the metal alkoxide is tetraethoxysilane or a hydrolyzate thereof.

3. The gas barrier laminate of claim 1, wherein the gas barrier layer contains a scale-like filler, the scale-like filler has a particle size of 0.2 to 10 μm and an aspect ratio of 50 or higher, and a total content of the at least one metal alkoxide or hydrolyzate thereof, and the scale-like filler is 5 to 30 wt % relative to the total mass of the solid content in the coating solution.

4. The gas barrier laminate of claim 1, wherein the polyvinyl alcohol has a degree of saponification of 90% or higher and a degree of polymerization of 500 or higher.

5. The gas barrier laminate of claim 1, wherein the substrate is paper/AlO.

6. The gas barrier laminate of claim 1, wherein the aqueous polyolefin resin comprises at least one selected from a carboxyl group, a salt of a carboxyl group, a carboxylic anhydride group, and a carboxylic ester.

7. A packaging body comprising the gas barrier laminate of claim 1.

* * * * *